United States Patent [19]

Kühl et al.

[11] 3,884,836

[45] May 20, 1975

[54] COMPOSITION FOR CATALYTIC DECOMPOSITION OF HYDROGEN

[75] Inventors: Dieter Kühl, Rathsberger, Germany; Manfredo Marchetto, Viale Oleandri, Italy

[73] Assignee: Siemens Aktiengesellschaft, Munich, Germany

[22] Filed: Feb. 8, 1973

[21] Appl. No.: 330,642

[30] Foreign Application Priority Data
Feb. 16, 1972 Germany.............................. 2207281

[52] U.S. Cl........... 252/455 R; 252/466 J; 252/471; 252/474; 252/476; 423/579
[51] Int. Cl.............................................. B01j 11/40
[58] Field of Search......... 423/579; 252/471, 455 R, 252/466 J, 474

[56] References Cited
UNITED STATES PATENTS

| | | | |
|---|---|---|---|
| 1,903,803 | 4/1933 | Barker................................ | 252/471 |
| 1,922,187 | 8/1933 | Zisch.............................. | 423/579 X |
| 2,697,730 | 12/1954 | Mecorney et al................... | 252/471 |
| 3,492,093 | 1/1970 | Start et al. .......................... | 423/579 |

FOREIGN PATENTS OR APPLICATIONS

| | | | |
|---|---|---|---|
| 544,207 | 7/1957 | Canada.............................. | 252/471 |

*Primary Examiner*—C. Dees
*Attorney, Agent, or Firm*—Kenyon & Kenyon Reilly Carr & Chapin

[57] ABSTRACT

Hydrogen peroxide is decomposed by contacting with a mixed-oxide catalyst comprising oxides of manganese, cobalt, copper, silver and lead.

11 Claims, No Drawings

COMPOSITION FOR CATALYTIC DECOMPOSITION OF HYDROGEN

DESCRIPTION OF THE INVENTION

The invention relates to a method for the catalytic decomposition of hydrogen peroxide and to a mixed-oxide catalyst useful in the hydrogen peroxide decomposition method described.

The decay or decomposition of hydrogen peroxide takes place according to the equation:

$$H_2O_2 \rightarrow H_2O + \tfrac{1}{2} O_2$$

In addition to water, this strongly exothermic reaction produces oxygen. Accordingly, hydrogen peroxide can serve as a source of oxygen when the reaction is permitted to proceed as shown in the above equation.

In fuel cells and fuel cell batteries, oxygen is usually used as the oxidizing agent. Frequently, the oxygen of the air is the source of the oxygen required to be reacted. However, use of air as the source of oxygen is accompanied by significant disadvantages, such as, carbonization of the alkaline electrolytes, increased polarization at the cathode, and increased energy requirement for compression to bring the air to the necessary operating pressure of the fuel cell or battery. For these and other reasons, pure oxygen is used in many cases instead of air as the oxidation agent for the generation of current in fuel cells and fuel cell batteries. The oxygen can be initially stored in pressurized containers or bottles. Although pure oxygen has certain advantages, there are accompanying drawbacks. For example, such pre-storage of oxygen may necessitate special manufacturing facilities away from the use site and transportation expenses. One method of producing oxygen has been through the decomposition of suitable compounds. Hydrogen peroxide $H_2O_2$ is particularly well-suited for this purpose.

Although hydrogen peroxide is a strongly endothermic compound, it is rather stable in pure condition, as well as in aqueous solution. The reason for this is that under these conditions, its rate of decomposition is essentially zero. However, the decomposition rate increases with increasing dilution. Furthermore, pH is a factor in determining the rate of decomposition. A minimum of self-decomposition of $H_2O_2$ is obtained at a pH value in the range of about 4. The decomposition of the hydrogen peroxide is substantially accelerated, however, by a number of substances, such as platinum, silver or manganese dioxide, or by rough surfaces and also by alkali such as NaOH. For this reason, stabilizing additives are generally admixed with hydrogen peroxide solutions. As stabilizers are used inorganic salts, such as stannates, phosphates and pyrophosphates, or acids, such as phosphoric acid, as well as organic compounds, such as dipicolinic acid (pyridine-2,6-dicarboxylic acid), citric acid and 8-hydroxyquinoline (oxine). Particularly combinations such as dipicolinic acid/pyrophosphate and stannate/citric acid find application here. The stabilizers maintain the pH value in the optimal range and serve to inactivate small amounts of materials which may catalyze the decomposition of hydrogen peroxide. The inside surface of the storage vessels can be kept passive through the addition of nitrates, such as ammonium nitrate.

Many catalysts are already known which are useful for the manufacture of oxygen by catalytic decomposition of hydrogen peroxide. In particular, metals such as gold, silver and platinum, oxides such as manganese dioxide ($MnO_2$) and salts of such as iron, chromium and copper salts are particularly useful for this purpose. Various functional requirements are placed on the decomposition catalysts, particularly, high activity, low solubility, long life, ease of manufacture and, low sensitivity to the stabilizers contained in the hydrogen peroxide solutions. The last requirement is designed to permit decomposition to take place in the presence of stabilizers. However, it is inadequately met by the catalysts known heretofore for the catalytic decomposition of hydrogen peroxide and the methods employed for this purpose.

It is an object of the invention to provide a method for the catalytic decomposition of hydrogen peroxide, which meets the above-named requirements through the use of novel decomposition catalysts. The catalysts of this invention possess high activity, low solubility and long life. In particular the catalysts have a high activity at room temperature and perform as effective decomposition catalysts in the presence of stabilizers which have been added to the hydrogen peroxide.

According to the invention, the decomposition of hydrogen peroxide is achieved by the use of a mixed catalyst containing oxides of the metals manganese, cobalt, copper, silver and lead.

In accordance with this invention, a mixed-oxide catalyst consisting of oxides of the metals manganese, cobalt, copper, silver and lead provide the above-named requirements to the system in a satisfactory manner. The catalyst is substantially insensitive to the stabilizers contained in the hydrogen peroxide. It exhibits long life, which we believe is explained by the fact that its effectiveness is not influenced negatively by the stabilizers. Furthermore, the catalyst is insoluble in the hydrogen peroxide. It should finally be noted as an advantage that the catalyst is highly active at room temperature, so that its full effectiveness is available at the start of the decomposition reaction. This is of great importance, since if for example, the catalyst is used in the catalytic decomposition of hydrogen peroxide, to make oxygen for fuel cells, then the amount of oxygen required for full output can be supplied to the fuel cells immediately upon putting them in operation.

A further advantage of the mixed-oxide catalyst is that an optimum combination can be attained between the stabilizers present in the hydrogen peroxide and the decomposition catalyst. It has been found that a mixed-oxide catalyst with a metal content of between about 20 and 30% by weight of manganese, 4 and 7% by weight of cobalt, 12 and 16% by weight of copper, 10 and 13% by weight of silver and 40 and 50% by weight of lead can be used to particular advantage if the hydrogen peroxide contains stabilizer combinations such as dipicolinic acid/pyrophosphate and/or stannate/citric acid. The catalyst also exhibits its advantageous effects in the presence of other stabilizers, such as 8-hydroxyquinoline. The metal content, which can lie in the ranges mentioned for the individual metals, add up to 100%.

According to the invention, the mixed catalyst used for the decomposition of hydrogen peroxide may advantageously have the following metal contents (in percent by weight): 22 – 26% Mn, 5 – 6% Co, 13 – 15% Cu, 11 – 12% Ag, and, 42 – 47% Pb. To particular advantage the catalyst may have the following metal contents (in percent per weight): 24.0% Mn, 5.5% Co, 14.4% Cu, 11.5% Ag and, 44.6% Pb.

In order to carry out the decomposition reaction, the catalyst is placed on a carrier material. The active element, consisting of the carrier material and the catalyst, is placed in a suitable decomposition apparatus. Advantageously, the catalyst can be applied to a ceramic aluminum oxide material as the carrier material. However, other materials can also be used as carrier materials; the carrier may, for instance, contain aluminum oxide together with aluminum silicate. These ceramic carrier materials, which are preferably porous, are well known in the art.

The invention will be explained in further detail with the aid of an example of an embodiment.

EXAMPLE 20 grams of manganese nitrate $Mn(NO_3)_2 \cdot 4 H_2O$, 5 grams of cobalt nitrate $Co(NO_3)_2 \cdot 6 H_2O$, 10 grams of copper nitrate $Cu(NO_3)_2 \cdot 3 H_2O$, 3.3 grams of silver nitrate $AgNO_3$, and 13 grams of lead nitrate $Pb(NO_3)_2$ are dissolved in about 100 ml of hot (for instance, at 90°C.) distilled water. The porous catalyst carrier is impregnated with the concentrated solution of the nitrates obtained in this manner. As catalyst carriers there are used, for instance, porous sintered blocks which consist of aluminum oxide and aluminum silicate. The silicon content of the sintered blocks is about 15% by weight. The porosity of the sintered blocks is advantageously between about 35 and 40% by volume. In addition to the existing pores the preferably plate-shaped sintered blocks can be provided with parallel holes which go completely through the sintered block. This facilitates the run-off of the water formed in the decomposition reaction as well as escape of the oxygen. The holes have, for instance, a diameter of about 1 mm and about 40 to 50 holes are present per square centimeter of the largest side of the sintered block. Thus, for example, sintered blocks with the dimensions 50 × 70 × 15mm and a weight of about 35 grams are used. The holes extend between the two lateral surfaces having the dimensions 50 × 70mm.

After impregnation with the hot concentrated solution of the metal nitrates, the carrier is dried at a temperature of about 80°C. to 90°C. Subsequently, the metal salts are decomposed in air by a heat treatment at about 400°C. (in a muffle furnace). The nitrates are thereby converted to oxides. In this manner there is applied to the sintered blocks of the type mentioned about 5 grams of mixed-oxide catalyst with a content of 24% Mn, 5.5% Co, 14.4% Cu, 11.5% Ag and 44.6% Pb.

Nine such sintered blocks with a total content of catalyst of about 46 grams are placed in a decomposition apparatus. Suitable decomposition apparatus is, for instance, a device which is disclosed in the German Published Pat. Application 1,956,726.

Another suitable decomposition device is disclosed in our U.S. Pat. application entitled "Method and Apparatus for Production of Gaseous Products" to be filed concurrently herewith to which reference is made. In this decomposition apparatus one or several columns of catalyst carriers impregnated with catalytic material are so arranged as to dispose the carriers on top of each other, and separate them by spacers. For each column a line for supplying liquid is provided. The columns advantageously contain porous sintered blocks which are separated from each other by insulating beads and may be provided with holes. The sintered blocks and the insulating beads consist advantageously of ceramic material. As housing material for the decomposition apparatus there is used, for instance, high-alloy chrome-nickel steel. For thermal insulation, the decomposition apparatus can additionally be enclosed in a container, preferably of asbestos cement.

Using the above-mentioned sintered blocks with a total catalyst content of 46 grams, 200 kg of 70% hydrogen peroxide solution in water stabilized with dipicolinic acid (50 ppm)/sodium pyrophosphate (10 ppm), can be decomposed. We have found that the $H_2O_2$ concentration in the reaction water is less than 0.1% by weight. Also, with decomposition of larger quantities of hydrogen peroxide the content of $H_2O_2$ in the reaction water is low; it does not rise above 0.5% by weight. Furthermore, only traces of metals can be detected in the reaction water.

The decomposition reaction occurs very rapidly, with the decomposition rate being very high at room temperature. During operation the decomposition temperature rises to about 200°C.

The catalyst also exhibits its advantageous properties if hydrogen peroxide stabilized with sodium stannate (10 mg/l)/citric acid (20 mg/l) is used. Here too, large quantities, i.e., several 100 kg, can be decomposed without appreciable quantities of hydrogen peroxide being contained in the reaction water.

It is likely that the advantageous effects of the mixed-oxide catalyst are based on the combination of the metal oxides, as investigations have shown that these effects cannot be obtained with individual metal oxides. Silver, for instance, is made inactive rather quickly and copper does not have sufficient activity at room temperature; $MnO_2$ separates rather quickly from the carrier material. The high activity of the mixed-oxide catalyst at room temperature may, at least in part, be due to the lead oxide content.

It will be understood that it is intended to cover all changes and modifications of the examples of the invention herein chosen for the purpose of illustration which do not constitute departures from the spirit and scope of the invention.

We claim:

1. A mixed-oxide catalyst for the decomposition of hydrogen peroxide, comprising oxides of the following metals in the following metal proportions between about 20 and 30% by weight of manganese, 4 and 7% by weight of cobalt, 12 and 16% by weight of copper, 10 and 13% by weight of silver, and 40 and 50% by weight of lead.

2. The catalyst according to claim 1 wherein the weight proportions of the metal content of said oxides is between about 22 and 26% by weight of manganese, 5 and 6% by weight of cobalt, 13 and 15% by weight of copper, 11 and 12% by weight of silver, and 42 and 47% by weight of lead.

3. The catalyst according to claim 1, wherein the weight proportions of the metal content of said oxides is about 24.0% by weight of manganese, 5.5% by weight of cobalt, 14.4% by weight of copper, 11.5% by weight of silver and 44.6% by weight of lead.

4. The catalyst according to claim 1 wherein the catalyst is on a carrier material.

5. The catalyst according to claim 2 wherein the catalyst is on a carrier material.

6. The catalyst according to claim 4, wherein said carrier material is a ceramic material comprising aluminum oxide.

7. The catalyst according to claim 5, wherein said carrier material is a ceramic material comprising aluminum oxide.

8. The catalyst according to claim 6, wherein said carrier material includes aluminum silicate.

9. The catalyst according to claim 7, wherein said carrier material includes aluminum silicate.

10. The catalyst according to claim 4, wherein the carrier material is porous and is provided with holes in addition to the pores.

11. The catalyst according to claim 5, wherein the carrier material is porous and is provided with holes in addition to the pores.

* * * * *